United States Patent

Smith et al.

[11] Patent Number: 5,869,163
[45] Date of Patent: *Feb. 9, 1999

[54] OPTICALLY READABLE THIN FILM DIGITAL DATA STORAGE MEDIUM AND PLAYBACK ADAPTOR

[75] Inventors: Raymond E. Smith, Sun City; Warren F. Molee, Laguna Niguel, both of Calif.

[73] Assignee: Cyberwerks Interactive, L.L.C., Los Angeles, Calif.

[ * ] Notice: The term of this patent shall not extend beyond the expiration date of Pat. No. 5,579,296.

[21] Appl. No.: 755,491

[22] Filed: Nov. 22, 1996

Related U.S. Application Data

[63] Continuation of Ser. No. 374,244, Jan. 18, 1995, Pat. No. 5,579,296.

[51] Int. Cl.[6] ........................................ B32B 3/00
[52] U.S. Cl. .................. 428/64.1; 428/64.2; 428/64.4; 428/64.7; 428/65.2; 428/457; 428/913; 369/275.1; 369/283; 369/288
[58] Field of Search ................................ 428/64.1, 64.2, 428/64.4, 64.7, 65.2, 457, 913; 369/273, 275.1, 275.3, 281, 283, 288

[56] References Cited

U.S. PATENT DOCUMENTS

| | | | |
|---|---|---|---|
| 2,416,135 | 2/1947 | Appleby | 274/5 |
| 3,825,323 | 7/1974 | Landwer | 350/255 |
| 3,863,266 | 1/1975 | Hoshino | 360/86 |
| 4,060,248 | 11/1977 | Lakerveld et al. | 274/41.6 |
| 4,334,302 | 6/1982 | Peppers | 369/261 |
| 4,335,173 | 6/1982 | Caraballo | 428/65 |
| 4,447,899 | 5/1984 | Geyer et al. | 369/111 |
| 4,812,633 | 3/1989 | Vogelgesang | 235/487 |
| 4,836,874 | 6/1989 | Foster | 156/209 |
| 4,868,373 | 9/1989 | Opheij et al. | 235/380 |
| 4,904,853 | 2/1990 | Yokokawa | 235/487 |
| 4,965,118 | 10/1990 | Kodera et al. | 428/137 |
| 5,058,098 | 10/1991 | Sakaue et al. | 369/284 |
| 5,208,088 | 5/1993 | Tominaga | 428/64 |

FOREIGN PATENT DOCUMENTS

| | | | |
|---|---|---|---|
| 92304325.1 | of 0000 | European Pat. Off. | G11B 23/40 |
| 0288580B1 | 11/1988 | European Pat. Off. | G11B 7/24 |
| 0422692A1 | 4/1991 | European Pat. Off. | G11B 7/24 |
| 2-247576 | of 0000 | Japan | G11B 23/03 |
| 2059666 | of 0000 | United Kingdom | G11B 23/48 |
| 2102614 | of 0000 | United Kingdom | G11B 2/84 |
| 1537382 | 12/1978 | United Kingdom | G11B 25/04 |
| 1538784 | 1/1979 | United Kingdom | G11B 25/04 |

*Primary Examiner*—Elizabeth Evans
*Attorney, Agent, or Firm*—Cahill, Sutton & Thomas

[57] ABSTRACT

An optically readable data storage medium includes a thin film data carrier fabricated from first and second juxtaposed plastic layers. A microembossed data surface is positioned within an interface zone and includes physically displaced surface elements which encode digital data. An adaptor temporarily receives and supports the thin film data carrier from below and includes a centrally located aperture geometrically compatible with a standard CD player spindle to enable the adaptor to be supported and rotated by the spindle. The adaptor includes a refraction zone having an area and a location underlying the microembossed data surface to enable the light beam from the light source of the CD player to be focussed onto the rotatable data surface. The reflected light beam modulated by the digital data encoded within the microembossed data surface is intercepted and converted to an electrical signal by the CD player optical readout device.

63 Claims, 10 Drawing Sheets

OPTICALLY READABLE THIN FILM DIGITAL DATA STORAGE MEDIUM AND PLAYBACK ADAPTOR

This a Continuation application of U.S. patent application Ser. No. 08/374,244, filed Jan. 18, 1995, entitled "OPTICALLY READABLE THIN FILM DIGITAL DATA STORAGE MEDIUM," now U.S. Pat. No. 5,579,296, issued on Nov. 26, 1996.

BACKGROUND OF THE INVENTION

1. Field of the Invention

This invention relates to optically readable digital data storage media, and more particularly, to optically readable thin film digital data storage media adapted to be compatible with CD audio and CD ROM playing equipment.

2. Description of the Prior Art

Compact discs or CD's have the capability of storing approximately 600 megabytes of digitized audio signals (CD audio) or digital data in a computer readable format (CD ROM).

Conventional CD discs are fabricated as standard-size rigid plastic discs by means of a mold-based replication system using injection molding techniques. Such CD manufacturing techniques have the capability of producing CD discs at the rate of only approximately twenty units per minute per mold. As a result of this relatively slow production rate, the cost of producing CD's is relatively high. The essentially all-plastic composition of CD's requires the consumption of a relatively significant amount of plastic during the manufacturing process.

Each CD includes a series of either circular or spiral data tracks which are illuminated and read by a source of coherent light such as a laser. The layer of rigid plastic positioned between each data track and the source of coherent light provides structural rigidity, protects the data tracks, and also functions as a single element, integral lens element having a forty-seven millimeter optical path length to refract and focus the coherent light beam onto a selected data track.

The relatively high cost of the CD plastic content and the slow injection molding production techniques involved in mass producing CD's has maintained the cost of this digital data storage medium relatively high.

SUMMARY OF THE INVENTION

It is a primary object of the present invention to provide a thin film digital data storage medium which can be duplicated at high speed by specialized microembossing techniques involving the use of a master embossing drum including a series of laterally spaced apart microembossing shims or masters permitting the simultaneous reproduction of multiple copies of a single microembossed master onto a web of low cost thin film material.

Another object of the present invention is to provide a thin film digital data storage medium which utilizes a thin film data carrier in combination with a reusable adaptor which temporarily receives and supports the data carrier from below and which simultaneously interfaces the data carrier with both the optical and physical geometry of a conventional CD player.

Still another object of the present invention is to provide a thin film digital data storage medium which can be mass-produced at a production rate in excess of thirty times the production rate of conventional CD's.

Still another object of the present invention is to provide a thin film digital data storage medium which can either be permanently or temporarily laminated to a card to facilitate storage and handling.

Briefly stated, and in accord with one embodiment of the invention, a thin film digital data storage medium is provided for a CD player having a centrally located spindle for supporting and rotating a CD having planar upper and lower surfaces. The thin film digital data storage medium includes a series of embedded data tracks each including encoded digital data. The data readout system of the CD player includes a source of coherent light positioned below the CD for generating a light beam to sequentially illuminate each data track to produce a reflected light beam modulated by the encoded digital data to be intercepted and converted to a corresponding electrical signal by an optical readout device.

The thin film digital data storage medium includes a thin film data carrier including a first layer, a second layer and a microembossed data surface. The first layer is formed from a plastic material having a defined thickness and first and second opposing surfaces. The second layer is formed from a second optically transparent plastic material having a first index of refraction and first and second opposing surfaces defining a first thickness for providing a secondary refraction zone. The first surface of the second layer is positioned adjacent to and is joined to the second surface of the first layer to define an interface zone located in proximity to those joined surfaces. The microembossed data surface is formed within the interface zone and includes physically displaced surface elements with an elevation varying relative to the undisplaced surface elements to encode digital data. The adaptor also includes a primary refraction zone formed from a second optically transparent material having a second index of refraction and first and second parallel opposing surfaces defining a second thickness. The primary refraction zone includes an area related to the area of the microembossed data surface and a location underlying the microembossed data surface. Sequential transmission of the light beam through the primary refraction zone of the adaptor and through the secondary refraction zone of the thin film data carrier focusses the light beam onto the microembossed data surface to produce a reflected light beam modulated by the digital data encoded within the microembossed data surface for interception and conversion into a corresponding electrical signal by the CD player optical readout device.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contributions to the art, various preferred physical embodiments of the invention will now be described in detail.

Figure 1:
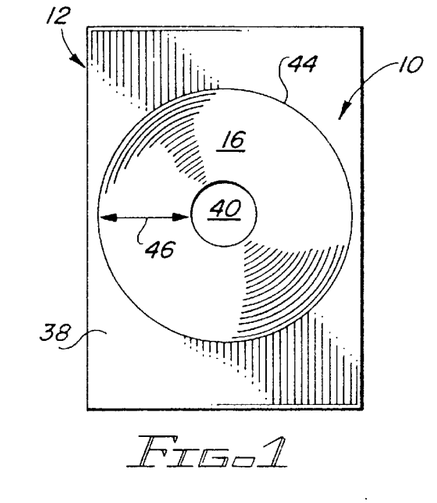
FIG. 1 represents an elevational view of a trading card version of the thin film data carrier of the present invention.
Figure 2:
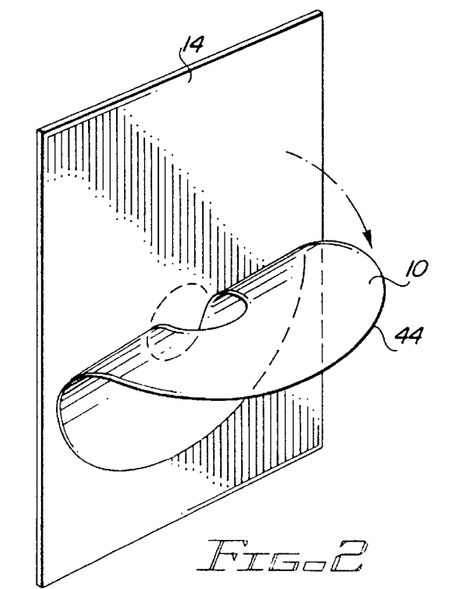
FIG. 2 illustrates a peel and play embodiment of the thin film data carrier of the present invention temporarily secured to a semi-rigid paper or plastic backing.

As illustrated in FIGS. 1 and 2, the thin film digital data storage medium 10 may either be configured as an essentially self-supporting card 12 or may be configured either as a non-rigid or semi-rigid element 10 removably secured to a semi-rigid support sheet 14.

Figure 3A:
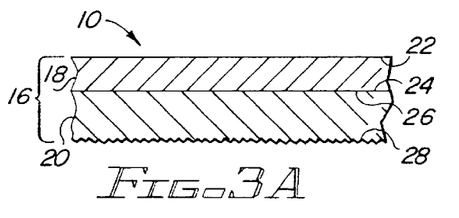
FIG. 3A illustrates a laminated embodiment of the thin film data carrier of the present invention with the microembossed data surface exposed.

FIG. 3A illustrates a first embodiment of a thin film data storage medium of the present invention in which a data carrier 16 includes a first layer 18 laminated or otherwise joined to a second layer 20. First layer 18 includes a first surface 22 and a planar, spaced apart second surface 24. Second layer 20 includes a first surface 26 and a planar, spaced apart second surface 28. First layer 18 may be fabricated from a 2–7 mil thick, semi-rigid plastic material such as polyester or synthetic paper. Second layer 20 may be fabricated from a 2–7 mil layer of optically transparent embossable plastic material having a first index of refraction. In the FIG. 3A embodiment, second surface 28 is formed as a microembossed data surface. Second layer 20 may be manufactured from a polycarbonate plastic or comparable low bi-refringence embossable material having similar optical clarity and light focussing characteristics.

Figure 3B:
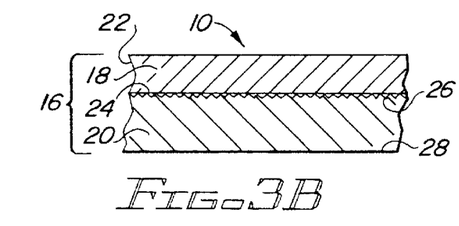
FIG. 3B illustrates a laminated version of the thin film data carrier of the present invention with the microembossed data surface located in an interface zone within the laminated structure.

FIG. 3B illustrates a second embodiment of a two-layer thin film digital data storage medium where data carrier 16 includes a second layer 20 fabricated from a 2–7 mil or thicker layer of embossable plastic material such as a polycarbonate having a first surface 26 formed as a microembossed data surface and an opposing second surface 28. In the FIG. 3B alternative embodiment, the relative position of the microembossed data surface has been reversed relative to the orientation illustrated in FIG. 3A.

Figure 3C:
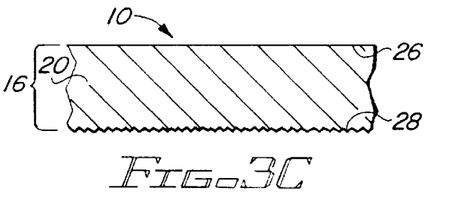
FIG. 3C illustrates a single layer embodiment of the thin film data carrier with the microembossed data surface exposed.

FIG. 3C illustrates a third alternative embodiment of the invention where data carrier 16 is fabricated with second layer 20 without first layer 18. In the FIG. 3C embodiment of the invention, second surface 28 is formed as the microembossed data surface. To provide a reasonable degree of rigidity, the FIG. 3C single layer data carrier 16 may be fabricated from a semi-rigid plastic material such as a polycarbonate having a thickness on the order of about 11 mils.

Figure 3D:
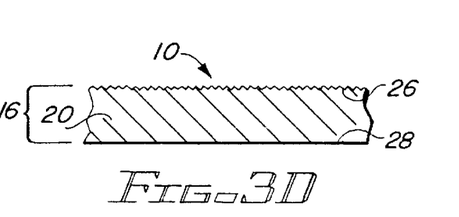
FIG. 3D illustrates a single layer embodiment of the thin film data carrier of the present invention with the microembossed data surface reversed relative to its position as illustrated in FIG. 3C.

FIG. 3D illustrates a fourth embodiment of the invention which is formed as a single layer data carrier 16. In the FIG. 3D embodiment, first surface 26 includes the microembossed data surface.

Any of the FIG. 3 embodiments of the invention will work acceptably, but additional protection for the microembossed data surface is provided by the FIG. 3B embodiment. A thin hard coat may be applied as a curable liquid to either or both exposed outer surfaces of the laminated or unlaminated materials illustrated in FIG. 3 to enhance the scratch resistant character of the system.

The preferred technique for microembossing digital data into the appropriate surface is disclosed in U.S. Pat. No. 4,836,874 (Foster) which is hereby incorporated by reference. Spectratek of Los Angeles, Calif. implements appropriate microembossing procedures for commercial customers.

A wide variety of data categories in various data formats may be embossed into and stored on the thin film digital data storage medium of the present invention by utilizing the techniques disclosed in the '874 patent. For sports trading card applications of the type illustrated in FIG. 1, digital data consisting of visual information including photographs or video, textual information including player biographical information, statistics, historical information, other data as well as music can be stored and recalled at will. Since the data storage format differs from CD audio data as opposed to CD ROM data, the thin film digital data storage medium of the present invention may be formatted in either of these formats or in any other currently available or subsequently developed data storage format.

Figure 4:
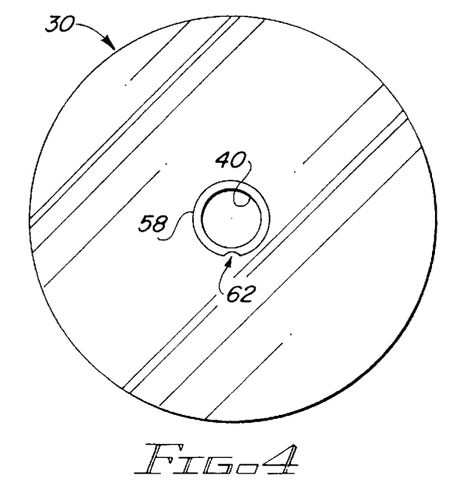
FIG. 4 illustrates one embodiment of an adaptor for the thin film data carrier of the present invention.
Figure 5:
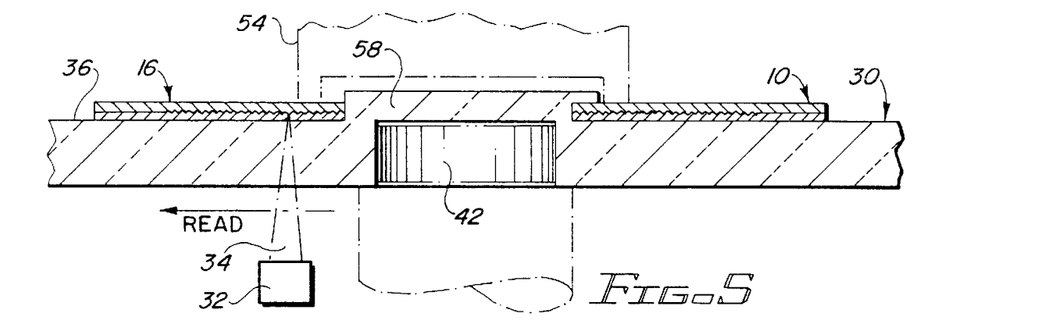
FIG. 5 illustrates a trading card embodiment of the thin film data carrier supported by the adaptor illustrated in FIG. 4.

Because it is a primary object of the present invention to provide a thin film digital data storage medium which can be rendered compatible with existing CD audio or CD ROM playing equipment, an adaptor 30 of the type illustrated in FIGS. 4 and 5 represents a necessary second element of the invention. As shown in FIG. 5, a source of coherent light typically taking the form of a laser 32 generates a coherent light beam 34 which must be sharply focussed on a specific data track intended to be read out by the CD hardware. When the selected data track is properly illuminated by the focussed coherent light beam 34, that beam produces a reflected light beam modulated by the encoded digital data which is directed to and intercepted by a conventional optical readout device (not shown) to convert the reflected light beam modulated by the encoded digital data into a corresponding electrical signal which is then decoded and read by a microprocessor-based decoding system. With prior art CD hardware, a lens positioned in the optical path of laser 32 partially converges the laser output beam while the remaining optical converging function is performed by the rigid optically transparent, refractive plastic layer of the CD which encapsulates the CD data tracks. That relatively thick plastic layer used with conventional CD products provides the necessary structural rigidity and maintains the requisite planar relationship between the upper and lower surfaces of the CD disc itself.

Because the thin film digital data storage medium of the present invention lacks complete structural rigidity and at best can be described as a semi-rigid medium, adaptor 30 is supplied as a second element of the system to perform the essential functions of 1) assisting in focussing the incoming laser beam, 2) assisting in focussing the outgoing laser data readout beam, 3) forming an essentially rigid, planar reference surface to maintain the laser beam focussed on the embossed thin film data tracks, 4) aligning the data storage medium relative to the adaptor, and 5) providing the structure necessary to align the adaptor relative to the CD player. If the adaptor is not configured to perform all five functions, a conventional CD player will not be able to read out the data encoded in the thin film digital data storage medium.

Figure 6:
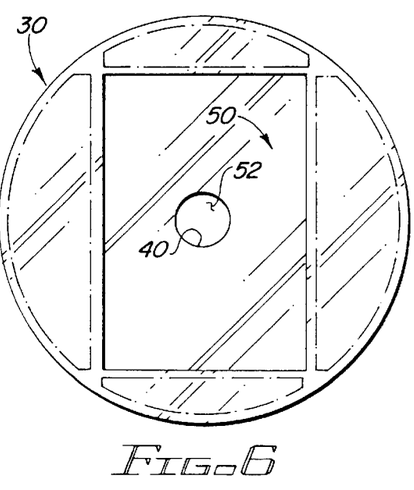
FIG. 6 illustrates a second embodiment of the adaptor including a recess for receiving the thin film data carrier.
Figure 7:
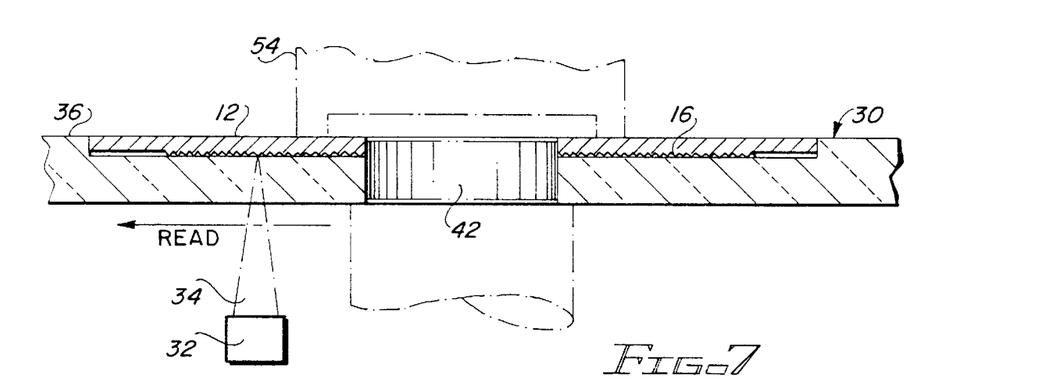
FIG. 7 illustrates the FIG. 6 adaptor receiving a thin film data carrier.
Figure 8:
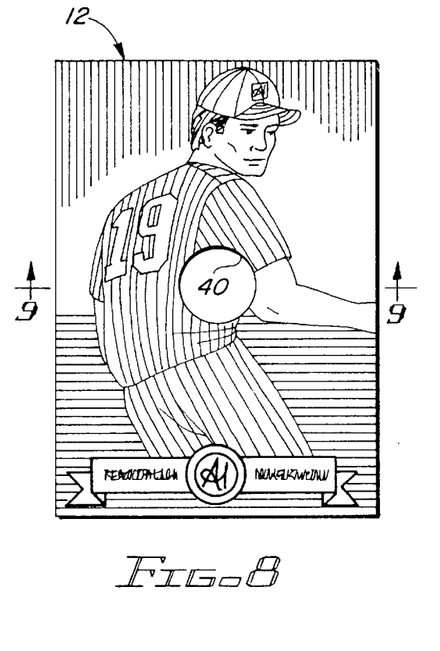
FIG. 8 illustrates the opposite side of the embodiment of the invention illustrated in FIG. 1.
Figure 9:
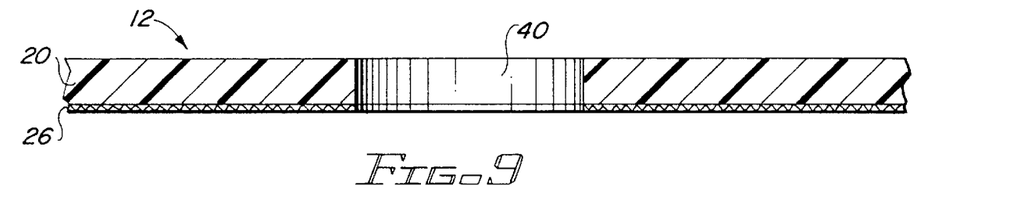
FIG. 9 represents a sectional view of the trading card embodiment of the thin film data carrier illustrated in FIG. 8.

As illustrated in FIGS. 6 and 7, the upper surface of adaptor 30 may include a rectangular recess having a depth configured to receive the composite thickness of a thin film data card in the form of a plastic or thick paper trading card 12 together with first and second plastic layers which serve as data storage elements, such that the upper surface of card 12 does not extend above the upper surface 36 of adaptor 30.

As illustrated in FIG. 1, thin film digital data storage medium 10 may be formed as a trading card 12. The central area of data carrier 16 includes a circular aperture 40 dimensioned to accommodate a CD drive spindle 42 as illustrated in FIGS. 5 and 7. The outer limit of data carrier 16 is defined by circular perimeter 44. The microembossed data surface is confined to the limits of data carrier 16 lying between aperture 40 and perimeter 44. For a standard 2½"×3½" sports trading card, the maximum data storage capacity of the resulting data surface approximates 64 megabytes using current data formats.

As illustrated in FIG. 5, the overall thickness of adaptor 30 may be configured to approximate the overall thickness of the refracting element of a conventional CD. FIGS. 3E–3H illustrate how the various embodiments of data carrier 16 shown in FIGS. 3A–3D may be coupled to an adaptor to sharply focus coherent light beam 34 from laser 32 at the precise elevation where the data tracks are located.

Figure 3E:
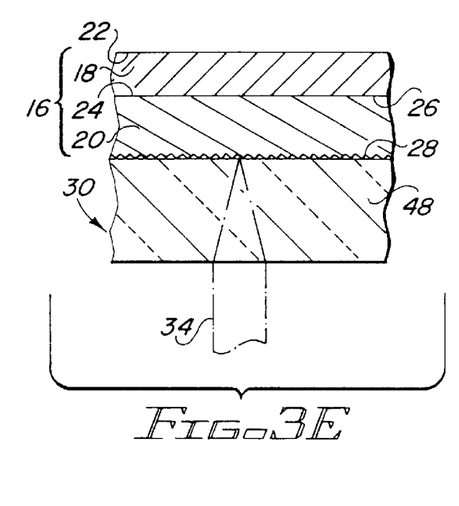
FIG. 3E illustrates the FIG. 3A embodiment of the thin film data carrier of the present invention supported by an adaptor.

FIG. 3E illustrates the FIG. 3A embodiment of the invention positioned on the upper surface of adaptor 30 with the microembossed data surface adjacent to the upper surface of adaptor 30. For any one of the four FIGS. 3E–3H embodiments of the invention, a semi-rigid peel and play backing 14 may be either temporarily or permanently bonded to the upper, exposed surface of data carrier 16.

Figure 3F:
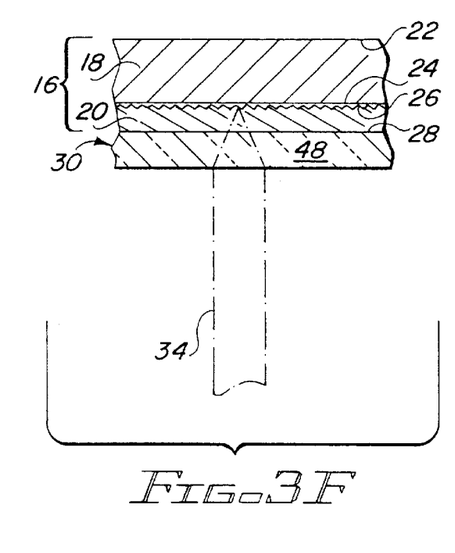
FIG. 3F illustrates the FIG. 3B embodiment of the thin film data carrier of the present invention supported by an adaptor.
Figure 3G:
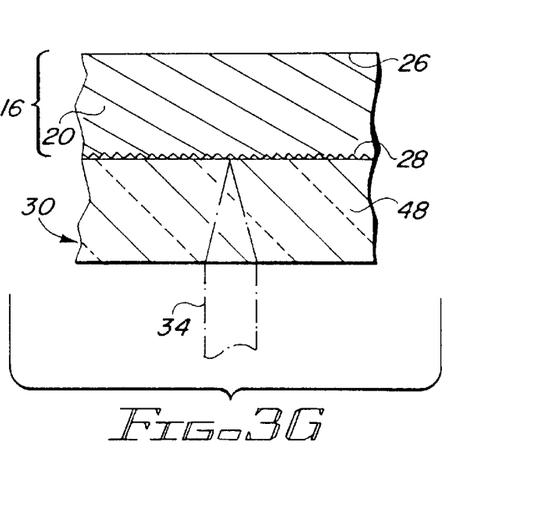
FIG. 3G illustrates the FIG. 3C embodiment of the thin film data carrier of the present invention supported by an adaptor.
Figure 3H:
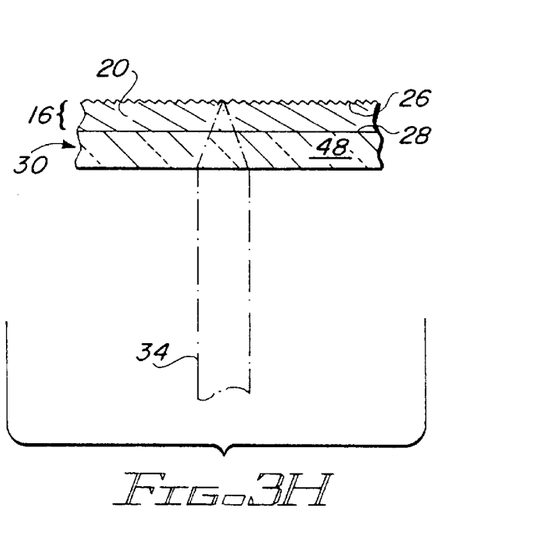
FIG. 3H illustrates the FIG. 3D embodiment of the thin film data carrier supported by an adaptor.

FIG. 3F illustrates the FIG. 3B embodiment of the invention placed on the upper surface of adaptor 30. FIGS. 3G and 3H illustrate respectively the FIGS. 3C and 3D embodiments of the invention supported by adaptor 30.

Because of the different relative elevation of the microembossed data surface in each of the different embodiments of the invention illustrated in FIGS. 3E–3H, the relative thickness and index of refraction of the transparent plastic material used to fabricate adaptor 30 may be adjusted as necessary to properly focus coherent light beam 34 onto the data tracks of the microembossed data surface by providing a total optical path length equivalent to the 47 mm optical path length of a conventional CD. A greater degree of convergence or refraction must be achieved by the refraction zone of adaptor 30 in the FIG. 3E and 3G embodiments since the microembossed data surface directly contacts the upper surface of adaptor 30. In the FIG. 3F and 3H embodiments, second layer 20 partially refracts light beam 34 and helps focus it on the data tracks. In those embodiments, the thickness of adaptor 30 will be reduced.

As illustrated in FIG. 6, the upper surface of adaptor 30 may include a recess compatible with the geometry of the member to be inserted within that recess. For the trading card embodiment of the invention illustrated in FIG. 1 having a 2½"×3½" exterior dimension, recess 50 will have corresponding dimensions and an appropriate depth. In addition, to remain compatible with conventional CD playback hardware, adaptor 30 must include a centrally located aperture 52 geometrically compatible with CD player spindle 42. Additional coupling between adaptor 30 and the relevant CD hardware may be provided in such hardware by a contact mechanism 54, typically spring-biased, as illustrated in FIGS. 6 and 7 which provides enhanced frictional contact between spindle 42 and the abutting surface of carrier 30 as well as between the exposed surface of trading card 12 and the abutting surfaces of contact mechanism 54.

Figure 10:
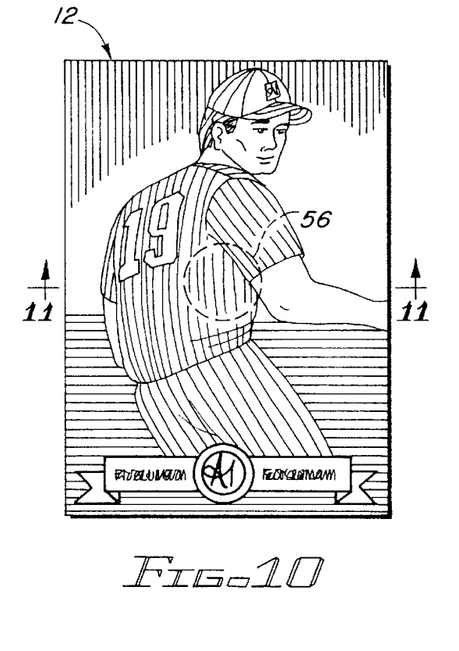
FIG. 10 illustrates another embodiment of the trading card embodiment of the thin film data carrier having a perforated, removable aperture.
Figure 11:
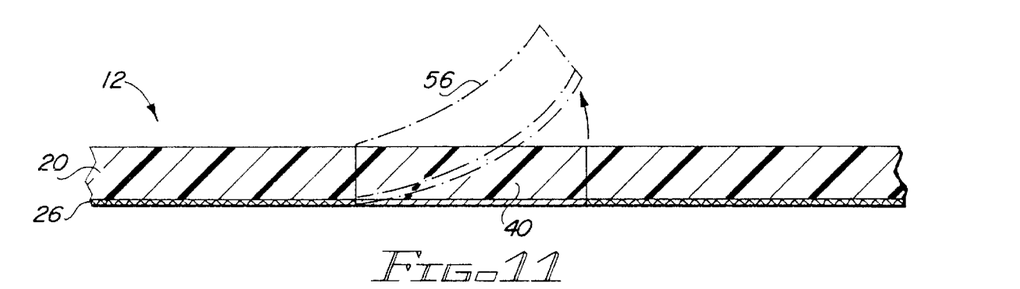
FIG. 11 represents an elevational view of the embodiment of the invention illustrated in FIG. 10.

In the trading card embodiment of the thin film digital data storage medium illustrated in FIGS. 1, 5, 8 and 9, aperture 40 extends entirely through thin film data carrier 16. FIGS. 10 and 11 illustrate a second embodiment of the invention having a perforated or partially die cut circular central section 56 designed to be readily removed prior to installation of trading card 12 on adaptor 30. The provision of perforated or partially die cut section 56 or an equivalent removable central section having either a reduced thickness or a reduced strength perimeter or being formed from a reduced strength material allows for the uninterrupted display of pictorial or text information on the upper surface of trading card 12 as illustrated in FIG. 10 as long as the card remains in its original condition prior to the removal of section 56. The diameter of section 56 is adjusted to accommodate spindle 42 of the CD player.

Figure 12:
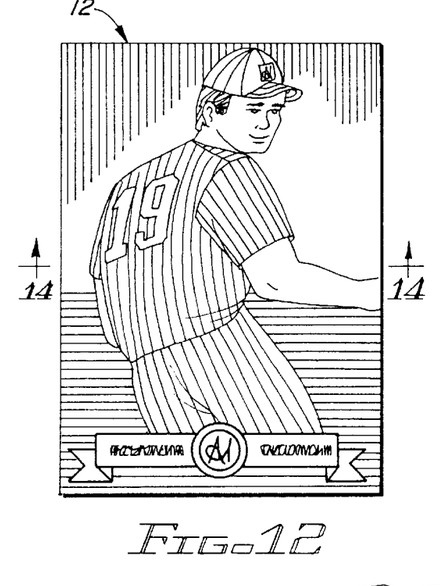
FIG. 12 illustrates another embodiment of the thin film data carrier of the present invention.
Figure 13:
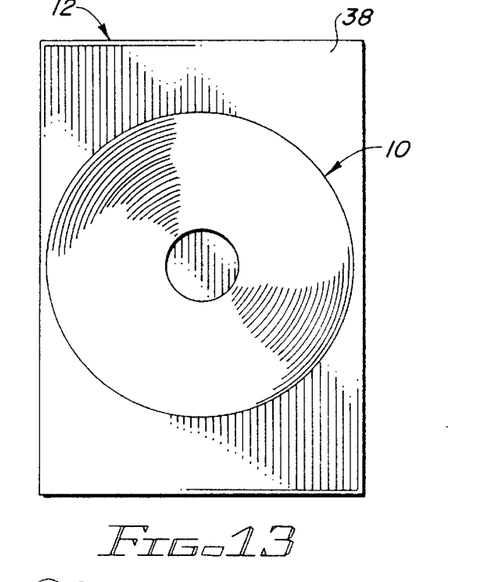
FIG. 13 illustrates a view from below of the embodiment of the invention illustrated in FIG. 12.
Figures 14, 15, 17, 18:
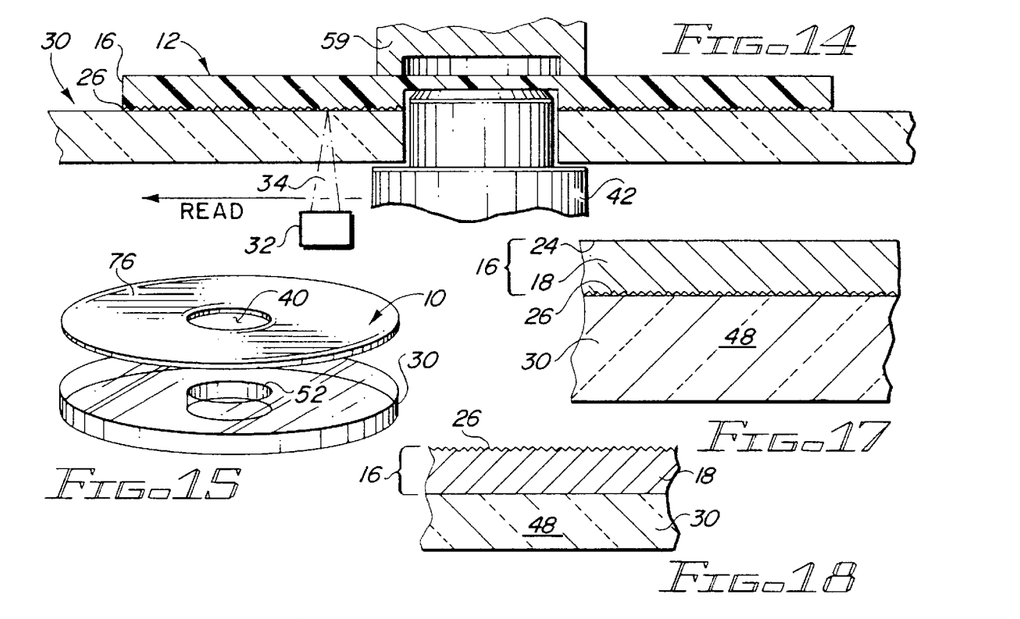
FIG. 14 represents an elevational view showing the FIG. 12 embodiment of the invention supported by an adaptor.
FIG. 15 illustrates the FIG. 2 peel and play embodiment of the thin film data carrier of the present invention showing its relationship to an adaptor.
FIG. 17 illustrates one configuration of the peel and play embodiment of the thin film data carrier installed on an adaptor.
FIG. 18 illustrates a second embodiment of the peel and play embodiment of the thin film data carrier installed on an adaptor.

In the second alterative embodiment of the trading card version of the invention illustrated in FIGS. 12, 13 and 14, data carrier 16 is supported by the upper surface of adaptor 30. Spindle 42 fits within the centrally located aperture of adaptor 30, but does not extend through either card 12 or data carrier 16. This particular embodiment of the invention requires a non-standard spindle configuration and may not be compatible with existing CD player hardware.

Figure 16:
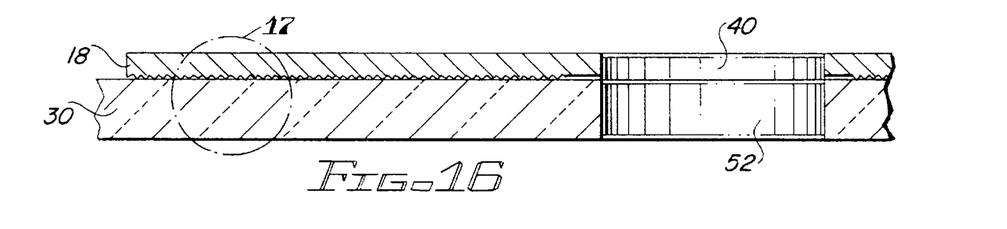
FIG. 16 illustrates a sectional view of the embodiment of the invention illustrated in FIG. 15 installed on an adaptor.

FIGS. 2 and 15–18 illustrate the peel and play version of the thin film data storage medium which is not necessarily self-supporting as was the case with the previously described trading card embodiment of the invention. As illustrated in FIG. 2, thin film digital data storage medium 10 is temporarily coupled to support sheet 14 by a specific form of adhesive well known to those skilled in the relevant art which allows thin film element 10 to be temporarily attached to semi-rigid support member 14 such as a plastic or paper postcard-type insert in a magazine. Immediately prior to use, thin film 10 is peeled away and removed from sheet 14 and, as illustrated in FIGS. 15 and 16, is placed on the upper surface a specially configured adaptor 30.

FIGS. 16, 17 and 18 illustrate that, as was the case with the system illustrated in FIGS. 3C and 3D, second layer 18 may be positioned either with the microembossed data surface down as illustrated in FIG. 17 or up as illustrated in FIG. 18. In each case, either the index of refraction of adaptor refraction zone 48 or the thickness of adaptor 30 must be adjusted to precisely converge light beam 34 onto the data tracks of data surface 26.

In the preferred embodiment of the invention, an adaptor to data carrier rotational coupling structure of the type illustrated in FIGS. 19–24 should be provided to prevent or minimize relative rotation between adaptor 30 and thin film 10. FIGS. 19–22 illustrate that adaptor 30 may be modified to include a rotational locking device 58 which is coupled to and extends above the adaptor upper surface 60 and at least partially surrounds aperture 52. Locking device 58 includes a slot 60 having an opening 62 and a closed end section 64 for receiving a rotational locking element such as a tab 66 which protrudes in an inward direction from aperture 40 of the two different thin film embodiments illustrated in FIGS. 23 and 24.

When thin film 10 is loaded into adaptor 30, tab 66 is carefully aligned with opening 62 so that an initial relative rotation as may occur during startup of the CD player between thin film 10 and adaptor 30 in the proper direction will cause tab 66 to rotate to a position which abuts the end 68 of slot 60 to effectively lock together thin film 10 and adaptor 30.

Figures 19, 20, 21:
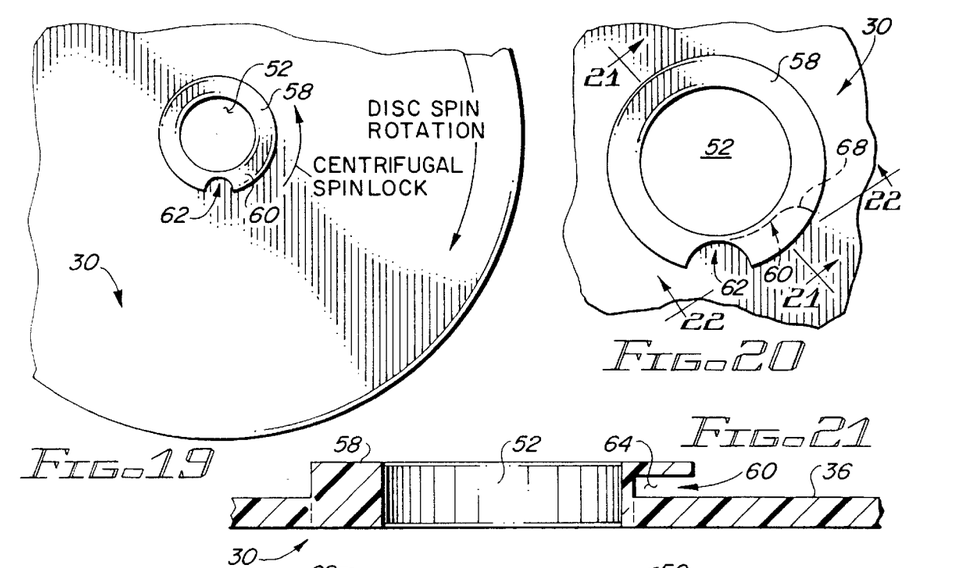
FIGS. 19–22 represent a series of drawings illustrating a rotational locking device forming a part of the adaptor of the present invention.

As illustrated in FIGS. 19 and 20, rotational locking device 58 may be injection molded separately from adaptor 30 and snapped into adaptor 30 which will typically be die cut in the desired shape from a rectangular plastic sheet. An abrasion resistant hard coat may be added to either or both surfaces of the plastic sheet prior to die cutting.

Figure 25A:
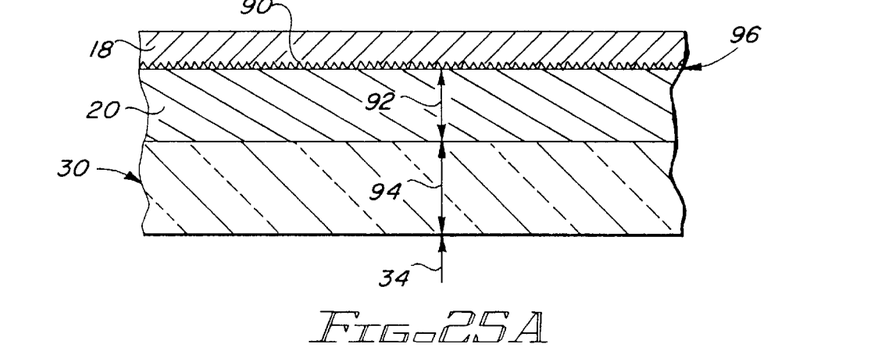
FIGS. 25A, 25B and 25C illustrate three additional embodiments of the thin film data carrier.
Figure 25B:
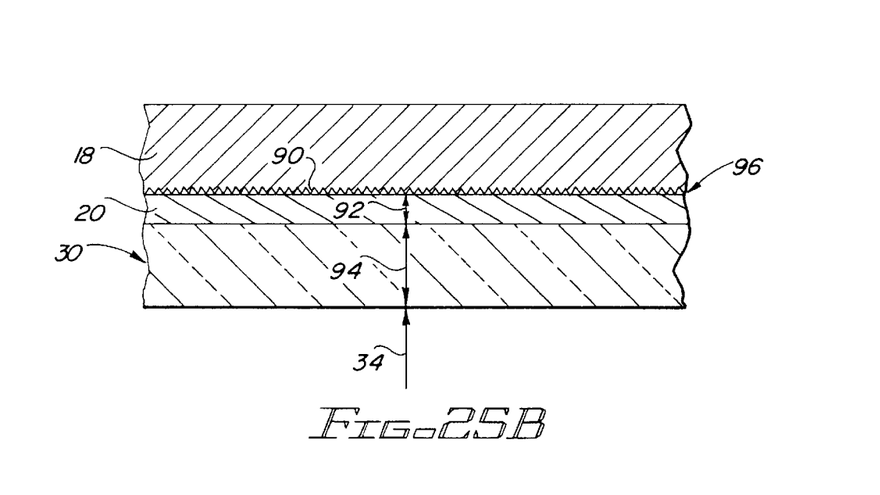
Figure 25C:
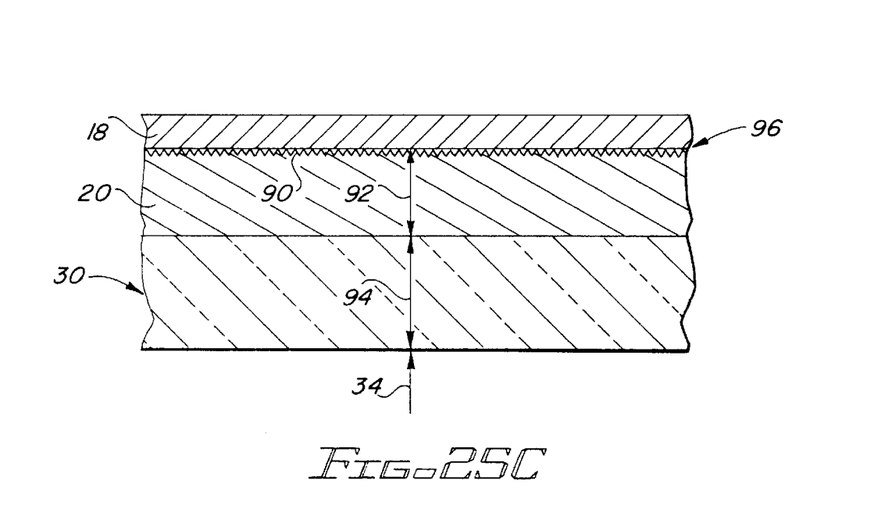

Referring now to FIGS. 25A–C, three additional embodiments of the invention will now be described in detail. FIG. 25A illustrates an embodiment of a thin film data carrier which includes first layer 18 fabricated from 1 mil embossed polyester vacuum deposited film. Second layer 20 is fabricated from 10 mil transparent polycarbonate which provides a secondary refraction zone between first and second surfaces 22 and 24 as indicated by the arrow designated by reference number 92. Reference number 96 illustrates the interface zone located in proximity to the junction between the adjacent, joined surfaces of first layer 18 and second layer 20 in which microembossed data surface 90 is formed. As illustrated in FIG. 25A, data surface 90 is formed in the lower, vacuum metalized surface of first layer 18.

Adaptor 30 is formed from acrylic plastic having a defined thickness which as illustrated by the arrow designated by reference number 94 forms a primary refraction zone.

Because conventional CD's provide an optical path length of 47 millimeters, the optical path length provided by the combined effect of the primary and secondary refractive zones of the present invention must be substantially equal to that 47 millimeter path length standard to allow the system of the present invention to be used with conventional CD players.

In the FIG. 25B embodiment of the invention, microembossed data surface 90 is formed on the lower or second surface of first layer 18 within the interface zone 96 which couples first layer 18 with second layer 20. In this embodiment of the invention, first layer 18 is formed from a flexible 8 to 12 mil plastic film fabricated from polyester, polyvinyl chloride, polycarbonate or an equivalent material. In this embodiment of the invention, the digital data is embossed directly into the second surface of first layer 18 which may be subsequently vacuum deposited with a reflective metal such as aluminum. Second layer 20 is provided by forming a thin coating of a low bi-refringence thermoset plastic over microembossed data surface 90.

Referring now to FIG. 25C, microembossed data surface 90 is formed in the upper or first surface of second layer 20 which may be fabricated from a relatively thin plastic film such as a film having a thickness of from about 8 mils to about 12 mils. Following the embossing operation, microembossed data surface 90 is covered with a thin protective coating of thermoset plastic. No special thickness, optical characteristic or other property is required for protective coating layer 18 because it serves neither as the primary or secondary refraction zone. Second layer 20, however, does perform a refracting function and requires a material having a low bi-refringence characteristic.

For most applications, microembossed data surface 90 will be formed as a part of a vacuum deposited layer of reflective metal such as aluminum either prior to or subsequent to the embossing operation. Such vacuum deposition procedures are well known to those of ordinary skill in the art.

Figure 26:
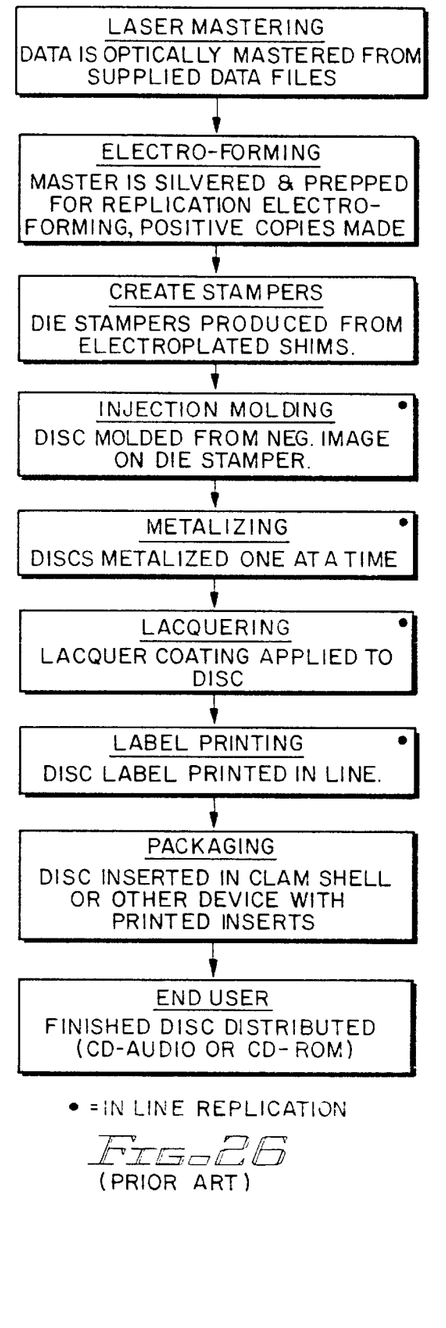
FIG. 26 illustrates a flow chart outlining the steps necessary to duplicate conventional CD's using injection molding techniques.
Figure 27:
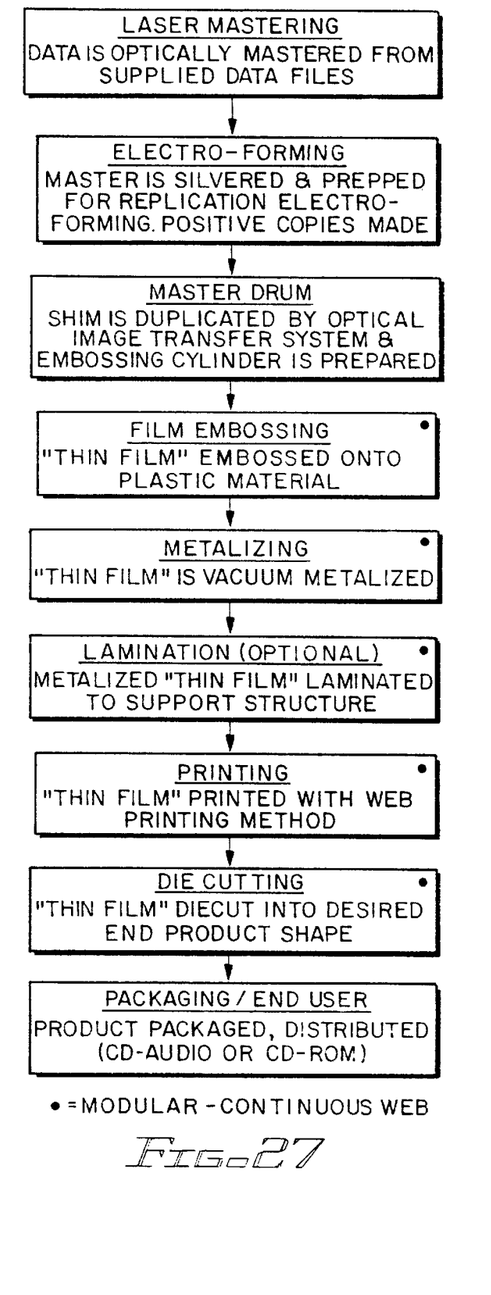
FIG. 27 represents a flow chart outlining the sequential series of steps which may be utilized to replicate different embodiments of the thin film digital data storage medium of the present invention.

FIG. 26 outlines the sequence of steps generally required to fabricate prior art single piece CD's which, using current technology, typically result in a production rate limited to approximately twenty CD units per injection molding cavity per minute. FIG. 27 summarizes production techniques which may be utilized in producing thin film digital data storage media according to the present invention. The FIG. 26 and 27 steps of laser mastering and electro-forming are well known to those of ordinary skill in the relevant art. Preparation of an appropriate form of embossing shim for microembossing digital data into the thin film of the present invention represents technology commercially available from Spectratek of Los Angeles, Calif. The FIG. 27 metalizing step vacuum deposits a thin layer of aluminum onto the microembossed data surface to enhance the reflectivity of that surface. The optional FIG. 27 lamination step is implemented only when the two layer embodiment of the invention illustrated in FIGS. 3A and 3B is used. The full upper surface area of the thin film digital data storage medium may be printed using conventional web printing techniques to display either images, text or both. The lower surface outside data zone 46 may also be printed.

Figure 28:
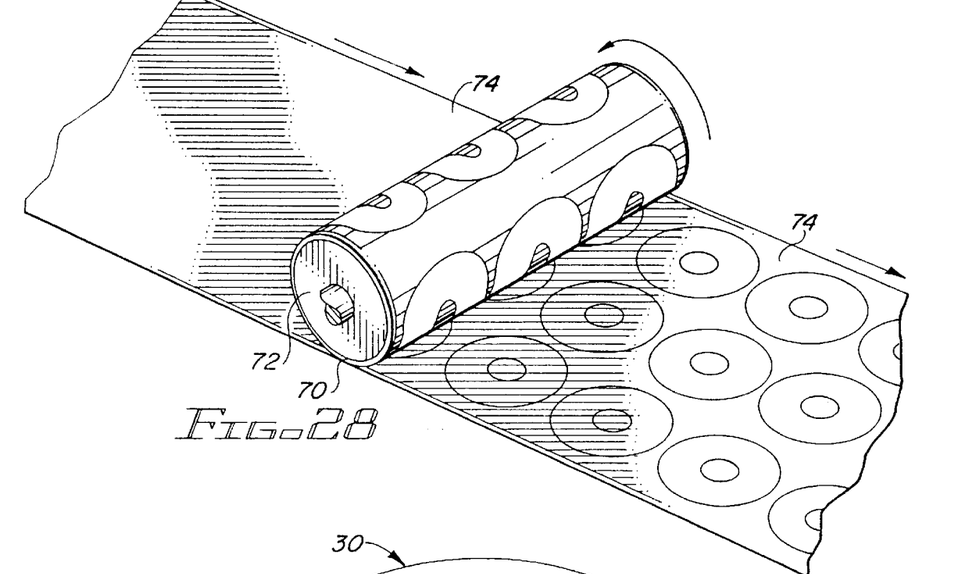
FIG. 28 illustrates a plastic web being microembossed with three laterally displaced data sets.

FIG. 28 illustrates that an appropriate form of embossing shim 70 may be wrapped around and coupled to a cylindrical embossing roller 72 which, using the unique techniques disclosed in the '874 patent as commercially practiced by Spectratek of Los, Angeles, Calif., yields a highly faithful reproduction of the relevant digital data on the exposed surface of plastic sheet material 74. The width of web 74 may readily be varied from about six inches to produce a width replication of a full size CD to a width of at least forty inches to simultaneously produce numerous laterally spaced apart duplicates of the microembossed pattern of embossing shim 70 as illustrated in FIG. 28.

Using the techniques disclosed in the '874 patent in combination with the multiple width data embossing techniques illustrated in FIG. 28, replication of the thin film digital data storage medium can be readily be accomplished at production rates of at least 720 units per minute, a rate substantially exceeding the twenty unit per minute production rate limit of conventional injection molded CD's. It is anticipated that this thin film production rate can be significantly enhanced.

Figure 22:
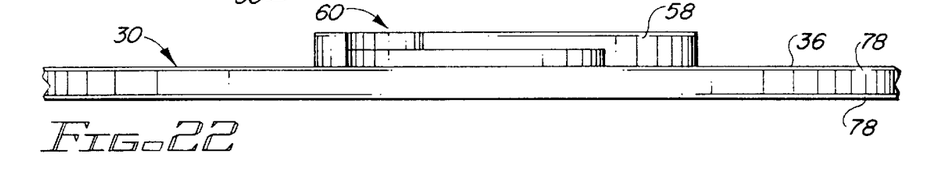
Figure 23:
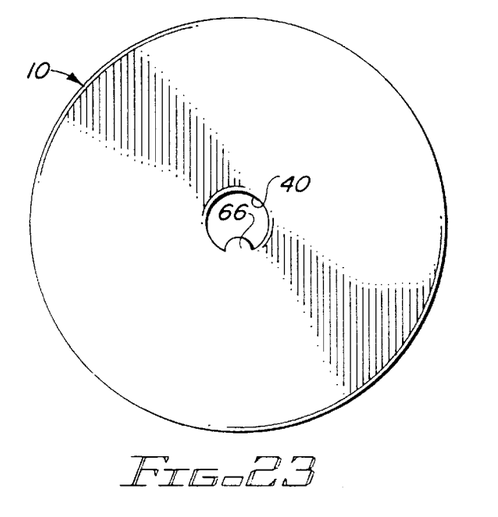
FIG. 23 illustrates a peel and play embodiment of the thin film data carrier of the present invention including a locking tab compatible with the locking device of the adaptor embodiment illustrated in FIGS. 19–22.
Figure 24:
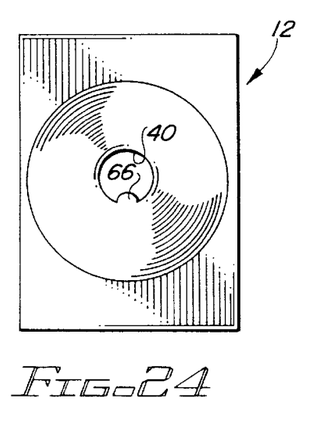
FIG. 24 illustrates a trading card embodiment of the thin film data carrier of the present invention having a locking tab compatible with the rotational locking device illustrated in the adaptor depicted in FIGS. 19–22.

To use the thin film digital data storage medium of the present invention, a customer typically purchases a single adaptor 30 which can be reused numerous times to read out the data stored on any one of a variety of compatible thin film products. Enhanced, potentially higher cost versions of adaptor 30 may include a hard coating 78 on either or both the upper and lower surfaces of the adaptor as illustrated in FIG. 22 to resist scratching which over a period of time might ultimately degrade the accuracy of the digital data readout.

As a result of the requirement to purchase only a single adaptor for use with a nearly unlimited number of thin film data storage media, the plastic content of the thin film product has been dramatically reduced and the manufacturing cost of such thin film products has been decreased to a level significantly below the cost of producing conventional CD's.

While the data storage capacity of a thin film product in the format of a 2½"×3½" trading card may be limited to only 64 megabytes, the substantially larger peel and play version of the thin film product is capable of storing the same 600 megabyte digital data capacity as a conventional CD.

Figure 29:
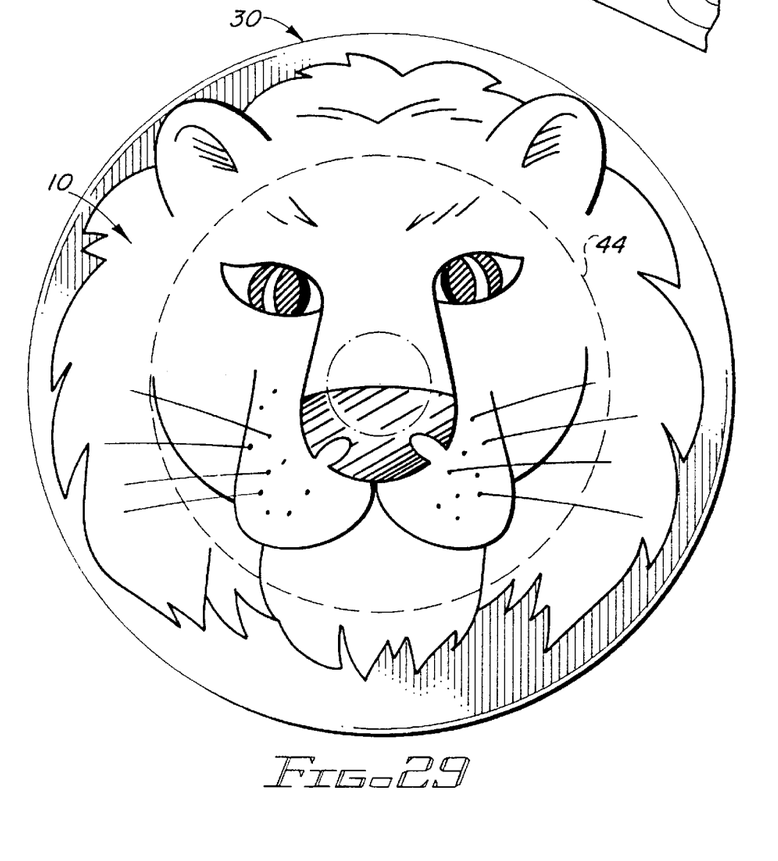
FIG. 29 illustrates a thin film digital data storage medium having a shape or perimeter configured to replicate the head of an animal.

Because adaptor 30 also serves the function of centering the thin film system relative to CD playback hardware and provides an area having a planar surface for receiving and maintaining the thin film system in a flat configuration aligned with the relevant CD player geometry, the actual perimeter configuration of the thin film system or its "shape" is relatively unimportant. For example, as illustrated in FIG. 29, the perimeter of a thin film product 10 may be configured as a circle, a square, a rectangle, a triangle, a star, an animal head or in any of a virtually limitless variety of different geometric shapes. For advertising and promotional applications, such shape flexibility represents a significant benefit.

Figure 30:
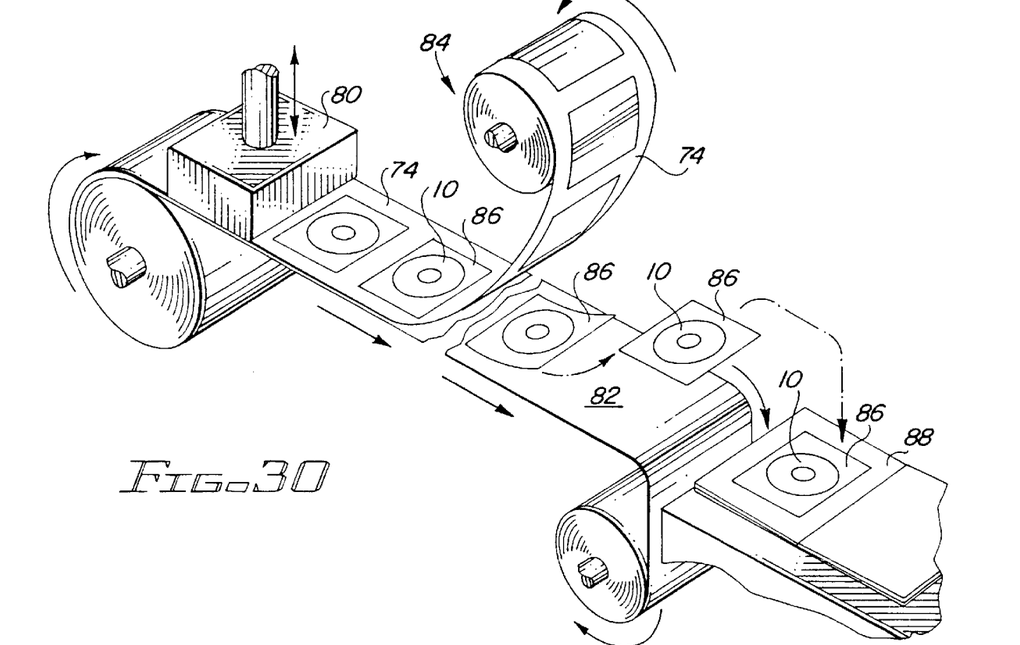
FIG. 30 illustrates a specific procedure for manufacturing the thin film digital data storage medium of the present invention and affixing the completed product to a magazine page.
Figure 31A:
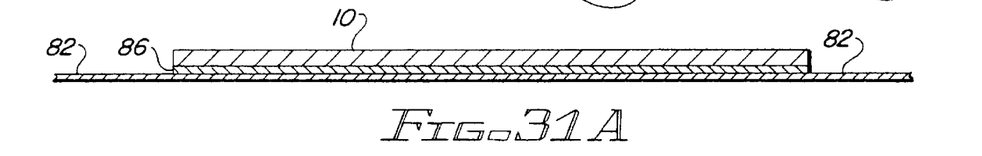
FIGS. 31A, 31B and 31C illustrate procedures for laminating and de-laminating a thin film digital data storage medium to a sheet of paper or magazine page.

Referring now to FIGS. 30 and 31A, a die cutting process utilizing close tolerance male and female tooling sequentially die-cuts previously embossed thin film digital data storage media 10 into the desired end product shape. Reference number 80 designates the male die. The female die is not shown. Rotary die cutting of the digital data storage media 10 may represent an alternative process. Carrier sheet 82 temporarily retains support carrier 86 and media 10 while the remainder of web 74 generally referred to as the "ladder" is wound onto take-up roll 84. Carrier 86 includes an upper surface attached to the lower surface of digital data storage medium 10 with a first form of adhesive which temporarily bonds medium 10 to support carrier 86. The opposite surface of support carrier 86 includes a more permanent form of adhesive.

Figure 31B:
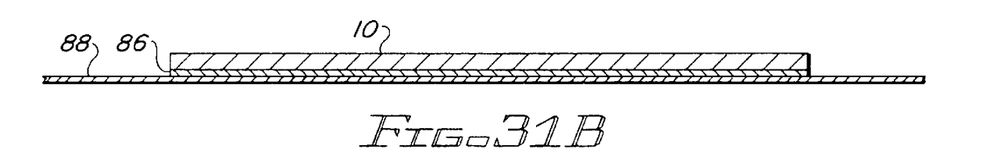

As illustrated in FIGS. 30 and 31B, the use of a conventional air label application system pneumatically separates digital data storage medium 10 and support carrier 86 from carrier sheet 82 and directs data storage medium 10 and support carrier 86 through the air and onto the exposed upper surface of a receiving sheet such as magazine page 88. FIG. 31B illustrates data storage medium 10 and support carrier 86 attached to magazine page 88.

Figure 31C:
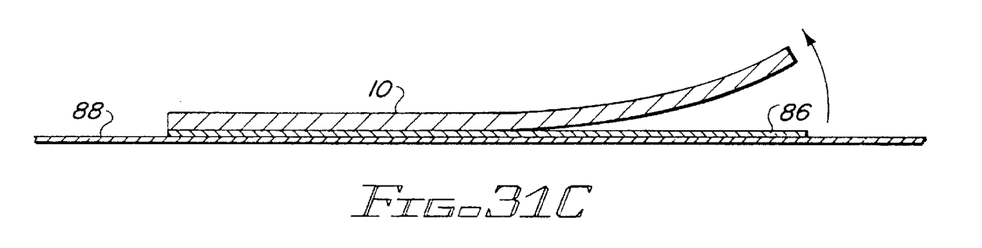

As illustrated in FIG. 31C, the releasable adhesive applied to the upper surface of support carrier 86 allows a consumer to readily peel back and remove the embossed digital data storage medium 10 from magazine page 88. Numerous other methods of distributing and using the digital data storage medium of the present invention would be readily apparent to those skilled in the relevant art in view of the present disclosure.

It will be apparent to those skilled in the art that the disclosed thin film digital data storage medium may be modified in numerous ways and may assume many embodiments other than the preferred forms specifically set out and described above. For example, the thin film digital data storage medium and adaptor system may also be used for video disc applications as well as CD's. Accordingly, it is intended by the appended claims to cover all such modifications of the invention which fall within the true spirit and scope of the invention.

We claim:

1. A thin film digital data storage medium for use with a CD player having a centrally located spindle for supporting and rotating a CD having planar upper and lower surfaces and including a series of embedded data tracks each including encoded digital data and a data readout system including a source of coherent light positioned below the CD for generating a light beam to sequentially illuminate each data track to produce a reflected light beam modulated by the encoded digital data to be intercepted and converted to a corresponding electrical signal by an optical readout device, the thin film digital data storage medium comprising:

a. a composite thin film data carrier including i. a first layer formed from a first plastic material and having a defined thickness and first and second opposing surfaces, ii. a second layer formed from a second optically transparent plastic material having a first index of refraction and first and second opposing surfaces defining a first thickness for providing a secondary refraction zone, the first surface of the second layer positioned adjacent to and joined to the second surface of the first layer to define an interface zone in proximity to those joined surfaces, iii. a microembossed data surface formed within the interface zone having physically displaced surface elements with an elevation varying relative to the undisplaced surface elements to encode digital data;

b. an adaptor for temporarily receiving and supporting the second surface of the second layer from below, for aligning the data carrier relative to the adaptor and having a centrally located aperture geometrically compatible with the CD player spindle for aligning the adaptor relative to the CD player and for enabling the adaptor to be supported and rotated by the spindle, the adapter further including a primary refraction zone formed from a second optically transparent material having a second index of refraction and first and second substantially parallel opposing surfaces defining a second thickness, the secondary refraction zone having an area related to the area of the microembossed data surface and a location underlying the microembossed data surface, whereby sequential transmission of the light beam through the primary refraction zone of the adaptor and through the secondary refraction zone of the thin film data carrier focusses the light beam onto the microembossed data surface to produce a reflected light beam modulated by the digital data encoded within the microembossed data surface for interception and conversion into a corresponding electrical signal by the CD player optical readout device.

2. The thin film digital data storage medium of claim 1 wherein the first thickness of the secondary refractive zone is less than the second thickness of the primary refraction zone.

3. The thin film digital data storage medium of claim 2 wherein a conventional CD includes an optical path length equal to 47 millimeters and wherein the first thickness of the second layer and the second thickness of the adaptor define an optical path length substantially equivalent to the 47 millimeter optical path length of a conventional CD.

4. The thin film digital data storage medium of claim 2 wherein the spindle includes a first diameter, wherein the adaptor aperture includes a second diameter, wherein the data carrier includes an aperture having a third diameter, and wherein the third diameter is substantially equal to or greater than the second diameter.

5. The thin film digital data storage medium of claim 4 wherein the adaptor includes a rotational locking device extending above the first surface of the adaptor and at least partially around the adaptor aperture for engaging the data carrier to prevent relative rotation between the adaptor and the data carrier.

6. The thin film digital data storage medium of claim 5 wherein the third diameter of the data carrier aperture exceeds the second diameter of the adaptor aperture and wherein the rotational locking device includes a slot positioned above the first surface of the adaptor, wherein the rotational locking element includes a tab extending radially inward from the data carrier aperture and wherein the adaptor slot engages the tab in the data carrier.

7. The thin film digital data storage medium of claim 6 wherein the rotational locking device is formed as a cylindrical section having an interior diameter approximately equal to the first diameter of the spindle and an exterior diameter approximately equal to the third diameter of the data carrier and wherein the slot is formed in a cylindrical section.

8. The thin film digital data storage medium of claim 2 wherein the data carrier includes an aperture alignable with the aperture in the adapter and geometrically compatible with the CD player spindle.

9. The thin film digital data storage medium of claim 2 wherein the data carrier further includes a substantially rigid substrate having a defined shape and first and second substantially parallel opposing surfaces, and wherein the second surface of the substrate is joined to the first surface of the first layer.

10. The thin film digital data storage medium of claim 9 wherein the substrate includes a rectangular shape and wherein the first surface of the substrate is imprinted with an image or text.

11. The thin film digital data storage medium of claim 10 wherein the first layer includes a first area, the second layer includes a second area and the substrate includes a third area.

12. The thin film digital data storage medium of claim 11 wherein the first and second areas are substantially equal and wherein the third area is greater than the first and second areas.

13. The thin film digital data storage medium of claim 1 wherein the first and second layers of the thin film data carrier are permanently bonded together.

14. The thin film digital data storage medium of claim 2 wherein the first index of refraction is substantially equal to the second index of refraction.

15. The thin film digital data storage medium of claim 2 wherein the spindle includes a first diameter, wherein the adaptor aperture includes a second diameter, wherein the data carrier includes a removable central section having a third diameter and a reduced strength perimeter, and wherein the third diameter is substantially equal to or greater than the second diameter.

16. The thin film digital data storage medium of claim 15 wherein the reduced strength perimeter of the removable central section is provided by a series of perforations along the perimeter.

17. The thin film digital data storage medium of claim 15 wherein the perimeter of the removable central section includes a thickness and wherein the reduced strength perimeter is formed by decreasing the thickness of the perimeter of the central section.

18. The thin film digital data storage medium of claim 15 wherein the removable central section is formed from a material having a reduced strength in comparison to the remainder of the data layer lying outside the central section perimeter.

19. The thin film digital data storage medium of claim 15 wherein the first surface of the first layer of the data carrier is imprinted with viewable information.

20. The thin film digital data storage medium of claim 1 wherein the first layer is fabricated from polyester with the second surface including a vacuum deposited metallic film and wherein the second layer is formed from a polycarbonate.

21. The thin film digital data storage medium of claim 20 wherein the polyester first layer includes a thickness of about 1 mil and wherein the polycarbonate second layer includes a thickness of about 10 mils.

22. The thin film digital data storage medium of claim 20 wherein the polycarbonate is substantially non-birefringent.

23. The thin film digital data storage medium of claim 13 wherein the microembossed data layer is protected from abrasion by being encapsulated between the first and second layers.

24. The thin film digital data storage medium of claim 1 wherein the thin film data carrier is flexible and wherein the adaptor is substantially rigid.

25. The thin film digital data storage medium of claims 1 or 5 wherein the data carrier includes a non-circular perimeter.

26. The thin film digital data storage medium of claim 25 wherein the microembossed data surface includes a circular perimeter and wherein the perimeter of the data carrier remains outside the perimeter of the data surface.

27. The thin film digital data storage medium of claim 13 wherein the physically displaced surface elements of the microembossed data surface are formed as circular data tracks and wherein the data carrier includes a circular perimeter.

28. A semi-rigid thin film data storage medium for use with an optical playback system having a centrally located spindle for engaging an optically readable data storage element having embedded data tracks consisting of encoded data, the playback system having a data readout system including a source of coherent light for generating a light beam to sequentially illuminate each data track to produce a reflected light beam modulated by the encoded data to be intercepted and converted to a corresponding electrical signal by an optical readout device, the thin film data storage medium comprising:
   a. a semi-rigid, self-supporting composite data carrier having a first area and including
      i. an optically transparent support layer formed from a stiff, semi-rigid material having a defined thickness and first and second opposing planar surfaces for providing a secondary refraction zone,
      ii. a thin film data layer formed from a flexible, non-self supporting plastic film having a first surface, the first surface of the thin film data layer positioned adjacent to and bonded to the second surface of the support layer; and
   b. an optically reflective microembossed data surface formed on the first surface of the thin film data layer within a data zone and having a series of spaced apart, displaced surface elements with an elevation offset relative to undisplaced surface elements to encode data, the secondary refraction zone of the support layer configured to receive and partially converge the playback system light beam but having insufficient refractive power to directly focus the light beam onto the microembossed data surface.

29. The thin film data storage medium of claim 28 wherein the data carrier includes a non-circular perimeter.

30. The thin film data storage medium of claim 28 wherein the data carrier includes a rectangular perimeter and wherein the microembossed data surface is formed within a circular data zone.

31. The thin film data storage medium of claim 28 wherein the thin film data layer includes a second surface capable of receiving and displaying an image or textual information.

32. The thin film data storage medium of claim 28 wherein the thin film data layer includes an ink printable second surface.

33. The thin film data storage medium of claim 32 further including a first visual media zone formed on the ink printable second surface of the thin film data layer for receiving and displaying a visually perceptible image or textual information.

34. The thin film data storage medium of claim 33 wherein the first surface of the support layer represents an image receiving surface and wherein the data carrier includes a second visual media zone on the first surface of the support layer outside the data zone for receiving and displaying a visually perceptible image or textual information.

35. The thin film data storage medium of claim 28 wherein the data carrier includes a non-circular perimeter, wherein the data carrier includes a rectangular perimeter, and wherein the microembossed data surface is formed within a circular data zone.

36. The thin film data storage medium of claim 28 wherein the data carrier includes an aperture geometrically compatible with the optical playback system spindle.

37. The thin film data storage medium of claim 28 wherein the secondary refraction zone of the support layer includes an optical path length substantially less than 47 millimeters.

38. The thin film data storage medium of claim 28 wherein the metallized layer includes a vacuum deposited metallic film.

39. The thin film data storage medium of claim 28 further including a transparent, protective hard coat formed on the first surface of the support layer.

40. The thin film data storage medium of claim 39 further including a transparent, protective hard coat formed on the second surface of the thin film data layer.

41. A semi-rigid thin film data storage medium for use with an optical playback system and an adapter, the playback system having a centrally located spindle for engaging an optically readable data storage element having embedded data tracks consisting of encoded data, the adapter having a primary refraction zone, a centrally located aperture compatible with the playback system spindle for aligning the adapter relative to the playback system, the playback system having a data readout system including a source of coherent light for generating a light beam to sequentially illuminate each data track to produce a reflected light beam modulated by the encoded data to be intercepted and converted to a corresponding electrical signal by an optical readout device, the thin film data storage medium comprising:
   a. a semi-rigid, self-supporting composite data carrier having a first area and including
      i. an optically transparent support layer formed from a stiff, semi-rigid material having a defined thickness and first and second opposing planar surfaces for providing a secondary refraction zone,
      ii. a thin film data layer formed from a flexible, non-self supporting plastic film having a first surface, the first surface of the thin film data layer positioned adjacent to and bonded to the second surface of the support layer; and
   b. an optically reflective microembossed data surface formed on the first surface of the thin film data layer within a data zone and having a series of spaced apart, displaced surface elements with an elevation offset relative to undisplaced surface elements to encode data, the secondary refraction zone of the support layer configured to receive and refract the playback system light beam after it has passed through and been partially converged by the adapter primary refractive zone to further converge and to focus the light beam onto the microembossed data surface.

42. The thin film data storage medium of claim 41 wherein the data carrier includes a non-circular perimeter.

43. The thin film data storage medium of claim 41 wherein the data carrier includes a rectangular perimeter and wherein the microembossed data surface is formed within a circular data zone.

44. The thin film data storage medium of claim 41 wherein the thin film data layer includes a second surface capable of receiving and displaying an image or textual information.

45. The thin film data storage medium of claim 41 wherein the thin film data layer includes an ink printable second surface.

46. The thin film data storage medium of claim 45 further including a first visual media zone formed on the ink printable second surface of the thin film data layer for receiving and displaying a visually perceptible image or textual information.

47. The thin film data storage medium of claim 46 wherein the first surface of the support layer represents an image receiving surface and wherein the data carrier includes a second visual media zone on the first surface of the support layer outside the data zone for receiving and displaying a visually perceptible image or textual information.

48. The thin film data storage medium of claim 41 wherein the data carrier includes a non-circular perimeter, wherein the data carrier includes a rectangular perimeter, and wherein the microembossed data surface is formed within a circular data zone.

49. The thin film data storage medium of claim 41 wherein the data carrier includes an aperture geometrically compatible with the playback system spindle.

50. The thin film data storage medium of claim 41 wherein the data carrier includes a removable central section capable of forming an aperture geometrically compatible with the playback system spindle.

51. The thin film data storage medium of claim 41 wherein the removable central section of the data carrier is formed by a series of perforations in the data carrier.

52. The thin film data storage medium of claim 41 wherein the secondary refraction zone of the support layer includes an optical path length substantially less than 47 millimeters.

53. The thin film data storage medium of claim 41 further including a metallized layer disposed on the first surface of the thin film.

54. The thin film data storage medium of claim 53 wherein the metallized layer includes a vacuum deposited metallic film.

55. The thin film data storage medium of claim 41 further including a transparent, protective hard coat formed on the first surface of the support layer.

56. The thin film data storage medium of claim 41 further including a transparent, protective hard coat formed on the second surface of the thin film data layer.

57. The thin film data storage medium of claim 41 further including a first transparent, protective hard coat formed on the first surface of the support layer and a second transparent, protective hard coat formed on the second surface of the thin film data layer.

58. A semi-rigid thin film digital data storage medium for use with an optical playback system having a centrally located spindle for supporting and rotating a standard optically readable medium having planar upper and lower surfaces and embedded data tracks consisting of encoded digital data, the optical playback system having a data readout system including a source of coherent light for generating a light beam to sequentially illuminate each data track to produce a reflected light beam modulated by the encoded digital data to be intercepted and converted to a corresponding electrical signal by an optical readout device, the thin film digital data storage medium comprising:

a. a semi-rigid, self-supporting composite data carrier having a non-circular outer perimeter and including
      i. an optically transparent support layer formed from a stiff, semi-rigid material having a defined thickness and first and second opposing planar surfaces for providing a secondary refraction zone,
      ii. a thin film data layer formed from a web of flexible, non-self supporting plastic film having a first surface and an opposing second surface, the first surface of the thin film data layer positioned adjacent to and bonded to the second surface of the support layer; and    b. an optically reflective microembossed data surface formed on the first surface of the thin film data layer within a data zone having a circular outer perimeter and having a series of spaced apart, displaced surface elements with an elevation offset relative to undisplaced surface elements to encode digital data, the secondary refraction zone of the support layer configured to receive and partially converge the light beam but having insufficient refractive power to directly focus the light beam onto the microembossed data surface, the data carrier having a non-circular outer perimeter defining a complementary area lacking encoded digital data disposed beyond the circular outer perimeter of the data zone and within the non-circular outer perimeter of the data carrier.

59. The thin film digital data storage medium of claim 58 wherein the shape of the complementary area does not represent a circular segment having a circular inner perimeter and a circular outer perimeter.

60. The thin film digital data storage medium of claim 58 wherein the non-circular outer perimeter of the data carrier includes a rectangular perimeter.

61. The thin film digital data storage medium of claim 60 wherein the data carrier further includes a first visual media zone formed on the second surface of the thin film data layer for receiving and displaying a visually perceptible image or textual information.

62. The thin film digital data storage medium of claim 58 wherein the data carrier further includes a first visual media zone formed on the second surface of the thin film data layer for receiving and displaying a visually perceptible image or textual information.

63. The thin film digital data storage medium of claim 62 wherein the second surface of the thin film data layer includes an ink printable surface.

* * * * *